United States Patent
Tomoda

(10) Patent No.: US 10,614,839 B2
(45) Date of Patent: Apr. 7, 2020

(54) MAGNETIC RECORDING HEAD AND MAGNETIC RECORDING AND REPRODUCING DEVICE COMPRISING THE SAME

(71) Applicants: Kabushiki Kaisha Toshiba, Minato-ku, Tokyo (JP); Toshiba Electronic Devices & Storage Corporation, Minato-ku, Tokyo (JP)

(72) Inventor: Yusuke Tomoda, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/214,940

(22) Filed: Dec. 10, 2018

(65) Prior Publication Data
US 2020/0005816 A1    Jan. 2, 2020

(30) Foreign Application Priority Data

Jun. 27, 2018    (JP) .................................. 2018-121884

(51) Int. Cl.
| G11B 5/39 | (2006.01) |
| G11B 5/127 | (2006.01) |
| G11B 5/31 | (2006.01) |
| G11B 5/00 | (2006.01) |

(52) U.S. Cl.
CPC .......... *G11B 5/3912* (2013.01); *G11B 5/1278* (2013.01); *G11B 5/315* (2013.01); *G11B 5/3123* (2013.01); *G11B 2005/0005* (2013.01)

(58) Field of Classification Search
CPC ... G11B 5/3912; G11B 5/3123; G11B 5/1278; G11B 5/315; G11B 2005/0005
See application file for complete search history.

(56) References Cited

U.S. PATENT DOCUMENTS

| 8,054,578 B2 * | 11/2011 | Kameda .................... G11B 5/11 360/119.04 |
| 8,243,387 B2 * | 8/2012 | Yamaguchi .......... G11B 5/1278 360/119.04 |
| 8,320,079 B2 | 11/2012 | Iwasaki et al. |
| 8,339,736 B2 | 12/2012 | Gao et al. |
| 8,355,222 B2 * | 1/2013 | Mino .................... G11B 5/1278 29/603.13 |
| 8,705,206 B1 * | 4/2014 | Maeda ..................... G11B 5/23 360/119.04 |

(Continued)

FOREIGN PATENT DOCUMENTS

| JP | 2018-45739 A | 3/2018 |
| JP | 2018-147540 A | 9/2018 |

*Primary Examiner* — Brian E Miller
(74) *Attorney, Agent, or Firm* — White & Case LLP

(57) ABSTRACT

According to one embodiment, a magnetic recording head includes a main magnetic pole which applies a recording magnetic field to a magnetic recording medium, an auxiliary magnetic pole which faces the main magnetic pole across a recording gap, a first magnetic bypass layer which is provided in a recording gap in a track direction, and a second magnetic bypass layer which is provided in the recording gap in the track direction and is arranged at a distance from the first magnetic bypass layer in a track width direction.

21 Claims, 9 Drawing Sheets

(56) References Cited

U.S. PATENT DOCUMENTS

| | | | |
|---|---|---|---|
| 8,720,044 B1* | 5/2014 | Tran | G11B 5/315 |
| | | | 29/603.11 |
| 8,824,103 B2* | 9/2014 | Shiimoto | G11B 5/314 |
| | | | 360/119.03 |
| 8,873,201 B2 | 10/2014 | Benakli et al. | |
| 9,508,364 B1* | 11/2016 | Tang | G11B 5/112 |
| 2005/0057851 A1* | 3/2005 | Oike | G11B 5/3116 |
| | | | 360/110 |
| 2011/0242701 A1* | 10/2011 | Ohtake | B82Y 10/00 |
| | | | 360/99.08 |
| 2015/0015992 A1* | 1/2015 | Funayama | G11B 5/23 |
| | | | 360/99.08 |
| 2016/0314809 A1* | 10/2016 | Taguchi | G11B 5/314 |
| 2018/0075868 A1 | 3/2018 | Koui et al. | |
| 2018/0261241 A1 | 9/2018 | Narita et al. | |

* cited by examiner

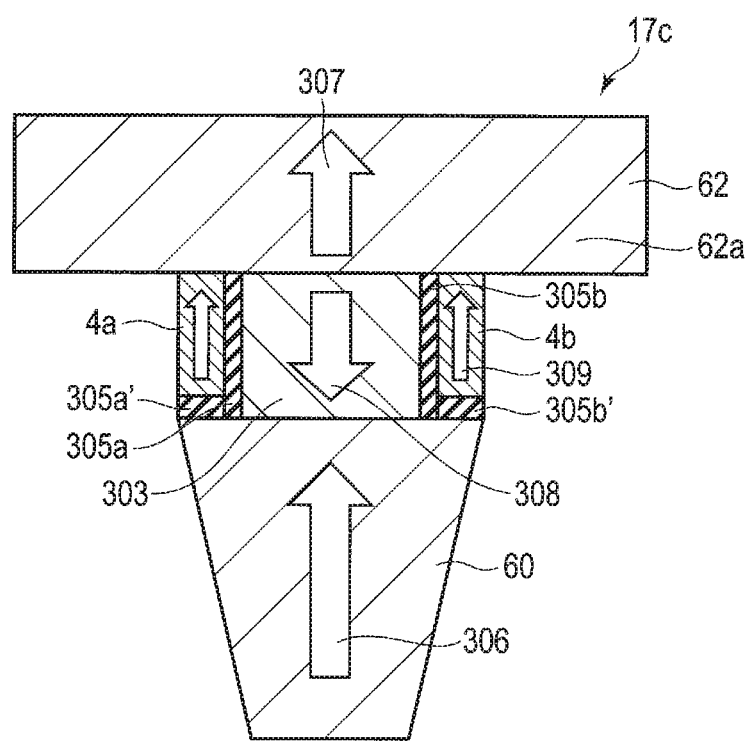
F I G. 10

MAGNETIC RECORDING HEAD AND MAGNETIC RECORDING AND REPRODUCING DEVICE COMPRISING THE SAME

CROSS-REFERENCE TO RELATED APPLICATIONS

This application is based upon and claims the benefit of priority from Japanese Patent Application No. 2018-121884, filed Jun. 27, 2018, the entire contents of which are incorporated herein by reference.

FIELD

Embodiments described herein relate generally to a magnetic recording head and a magnetic recording and reproducing device comprising the same.

BACKGROUND

In a magnetic recording head, when a write current is supplied to a recording coil, the direction of magnetization of a main magnetic pole and the direction of magnetization of an auxiliary magnetic pole are aligned with each other in substantially the same direction in a track direction. In this occasion, most of a magnetic field generated from the main magnetic pole is emitted to a magnetic disk and recording is performed, but part of the magnetic field is led directly into the auxiliary magnetic pole via a recording gap and does not contribute to recording. Therefore, a nonmagnetic material is generally applied to the recording gap, but a fringing field to adjacent tracks tends to be generated.

BRIEF DESCRIPTION OF THE DRAWINGS

FIG. 10 is a view when a magnetic recording head of an HDD according to a third modified example is viewed from an ABS.

DETAILED DESCRIPTION

Figure 1:
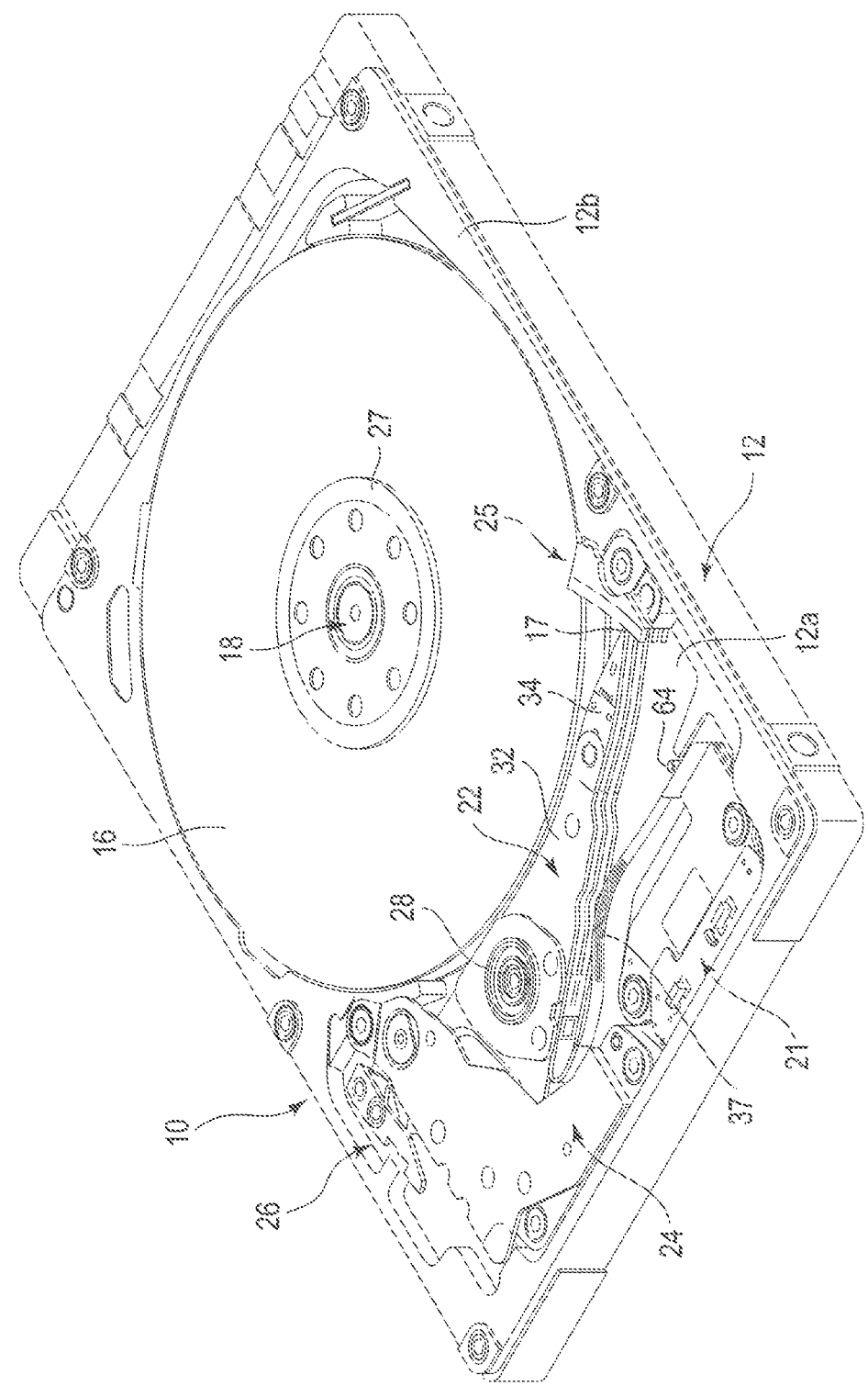
FIG. 1 is a perspective view showing a hard disk drive (HDD) according to an embodiment.

In general, according to one embodiment, a magnetic recording head includes a main magnetic pole which applies a recording magnetic field to a magnetic recording medium, an auxiliary magnetic pole which faces the main magnetic pole across a recording gap, a first magnetic bypass layer which is provided in a recording gap in a track direction, and a second magnetic bypass layer which is provided in the recording gap in the track direction and is arranged at a distance from the first magnetic bypass layer in a track width direction.

A disk device according to an embodiment will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

Figure 2:
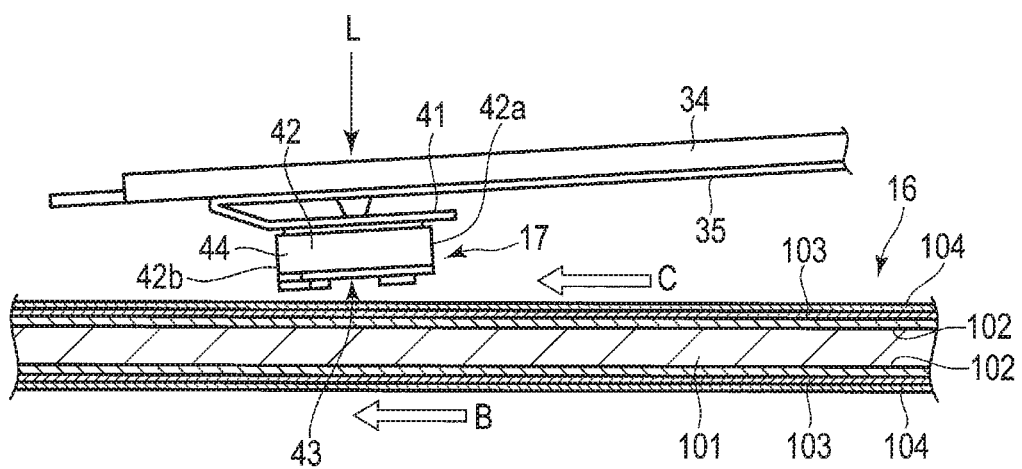
FIG. 2 is a side view showing a magnetic head and a suspension of FIG. 1.

FIG. 1 shows the inner structure of a hard disk drive (HDD) according to an embodiment with its top cover removed, as the disk device, and FIG. 2 shows a magnetic head in a flying state. As shown in FIG. 1, the HDD comprises a housing 10. The housing 10 comprises a base 12 which has the shape of a rectangular box whose upper surface is open, and a top cover (not shown) which is secured to the base 12 with a plurality of screws and closes an upper end opening of the base 12. The base 12 comprises a bottom wall 12a which is rectangular and side walls 12b which stand along the peripheral edges of the bottom wall. The top cover is secured to the base 12 with a plurality of screws and closes the upper end opening of the base 12.

In the housing 10, for example, two magnetic disks 16 as magnetic media, and a spindle motor 18 as a driver which supports and rotates the magnetic disks 16 are provided. The spindle motor 18 is provided on the bottom wall 12a. Each of the magnetic disks 16 includes magnetic recording layers on upper and lower surfaces thereof. The magnetic disks 16 are coaxially engaged with a hub (not shown) of the spindle motor 18, and are clamped by a clamp spring 27 and are secured to the hub. As a result, the magnetic disks 16 are supported so as to be parallel to the bottom wall 12a of the base 12. The magnetic disks 16 are rotated at predetermined speed by the spindle motor 18.

In the housing 10, a plurality of magnetic heads 17 which record information on and reproduce information from the magnetic disks 16, and a carriage assembly 22 which supports these magnetic heads 17 movably with respect to the magnetic disks 16 are provided. In the housing 10, a voice coil motor (hereinafter referred to as a VCM) 24 which rotates and positions the carriage assembly 22, a ramp load mechanism 25 which holds the magnetic heads 17 at an unload position separated from the magnetic disks 16 when the magnetic heads 17 move to the outermost peripheries of the magnetic disks 16, a latch mechanism 26 which holds the carriage assembly 22 at a retreat position when an impact or the like is applied to the HDD, and a flexible printed circuit (FPC) unit 21 equipped with an electronic component such as a conversion connector are further provided.

A control circuit board (not shown) is screwed to the outer surface of the base 12 and is located so as to face the bottom wall 12a. The control circuit board controls the operation of the spindle motor 18 and also controls the operation of the VCM 24 and the operation of the magnetic heads 17 via the FPC unit 12.

The carriage assembly 22 comprises a bearing 28 which is secured to the bottom wall 12a of the base 12, a plurality of arms 32 which extend from the bearing 28, and a plurality of suspensions 34 which have the shape of an elastically deformable, long and thin plate. The suspensions 34 are secured to the distal ends of the arms 32 by spot welding or adhesion at proximal ends thereof, and extend from the arms 32. The magnetic heads 17 are supported on the extending ends of the suspensions 34, respectively. The suspensions 34 and the magnetic heads 17 face each other with the magnetic disks 16 sandwiched between the suspensions 34 and the magnetic heads 17.

As shown in FIG. 2, each magnetic head 17 is constituted as a flying head, and comprises a slider 42 which has the shape of a substantially rectangular parallelepiped and a head portion 44 for recording and reproduction which is provided at the outflow end (trailing end) of the slider 42. The magnetic head 17 is secured to a gimbal spring 41 provided in the distal end portion of the suspension 34. Due to the elasticity of the suspension 34, a head load L toward the surface of the magnetic disk 16 is applied to each magnetic head 17. As shown in FIGS. 1 and 2, each magnetic head 17 is electrically connected to the FPC unit 21 via a wiring member 35 secured to the suspension 34 and the arm 32 and a relay FPC 37.

Next, the structure of the magnetic disks 16 and the structure of the magnetic heads 17 will be described in detail.

Figure 3:
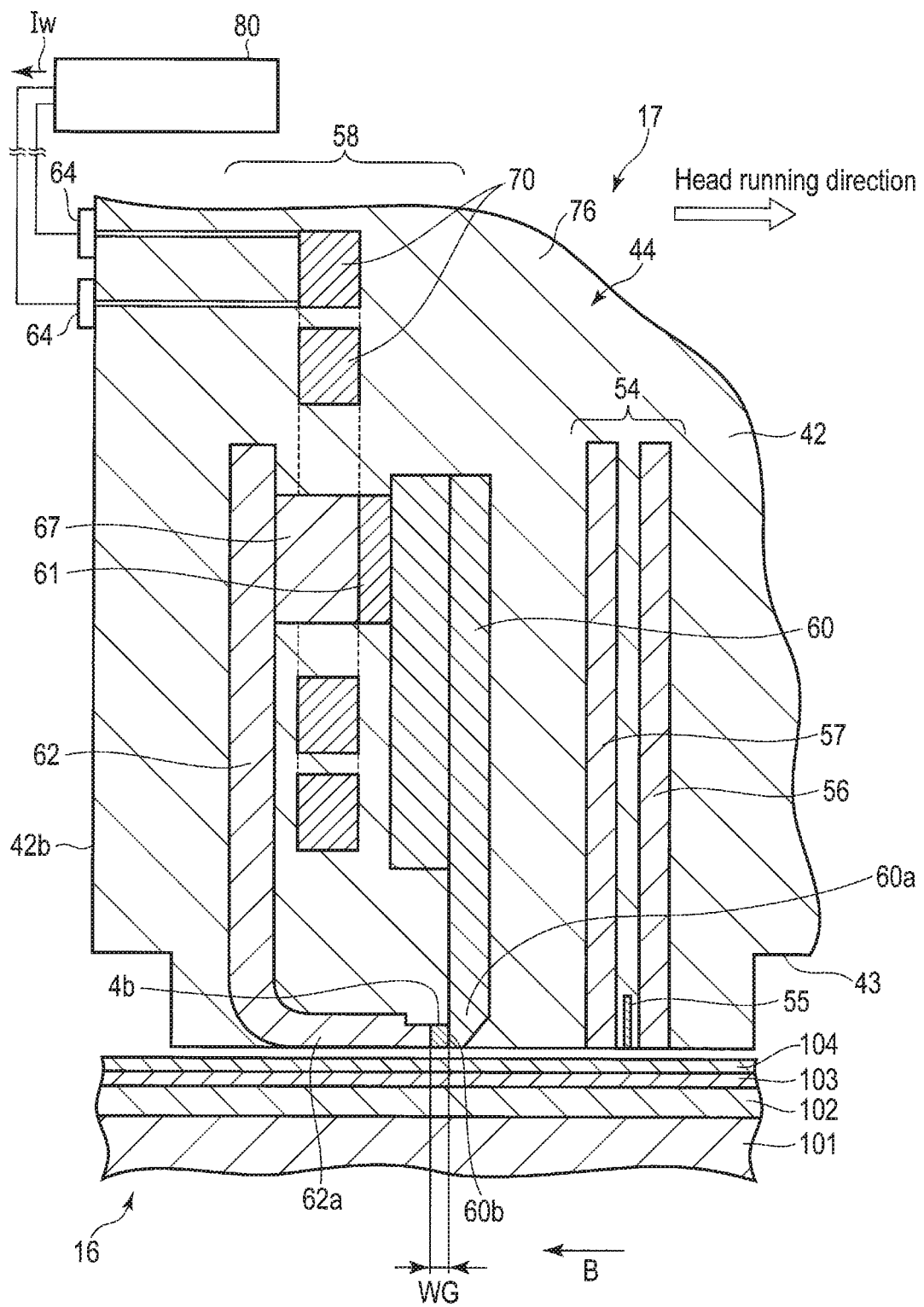
FIG. 3 is an enlarged sectional view showing a head portion of the magnetic head of FIG. 2.

As shown in FIGS. 1 to 3, the magnetic disk 16 comprises a substrate 101 formed of a nonmagnetic material in the shape of a circular plate having a diameter of about 2.5 inches (6.35 cm). On each of the surfaces of the substrate 101, a soft magnetic layer 102 formed of a material showing soft magnetic properties as an underlayer, a magnetic recording layer 103 having magnetic anisotropy in a direction perpendicular to a disk surface on top of the layer, and a protective layer 104 on top of the layer are stacked in order.

Figure 4:
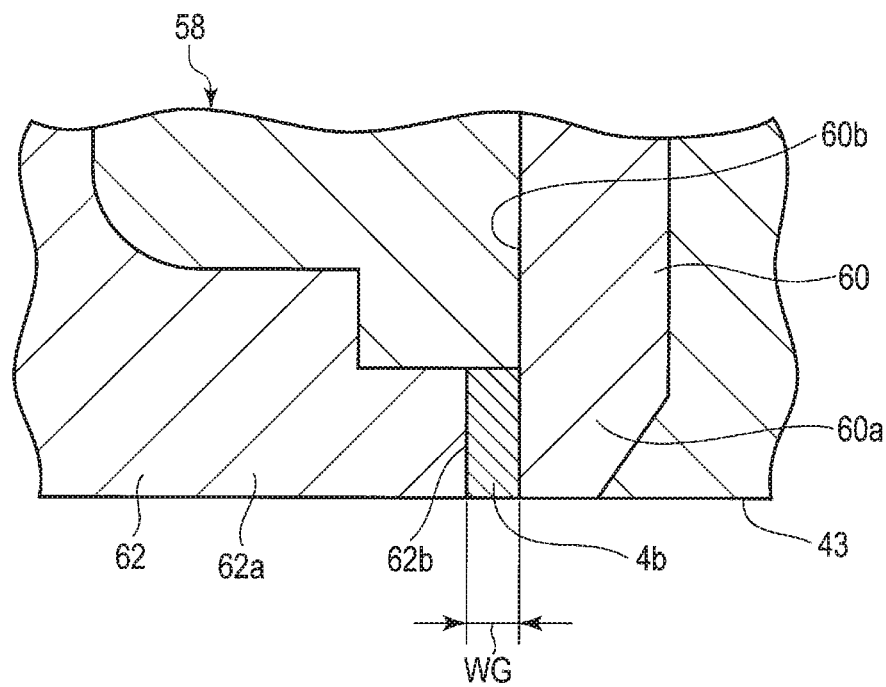
FIG. 4 is an enlarged sectional view showing the head portion of the magnetic head of FIG. 3.
Figure 5:
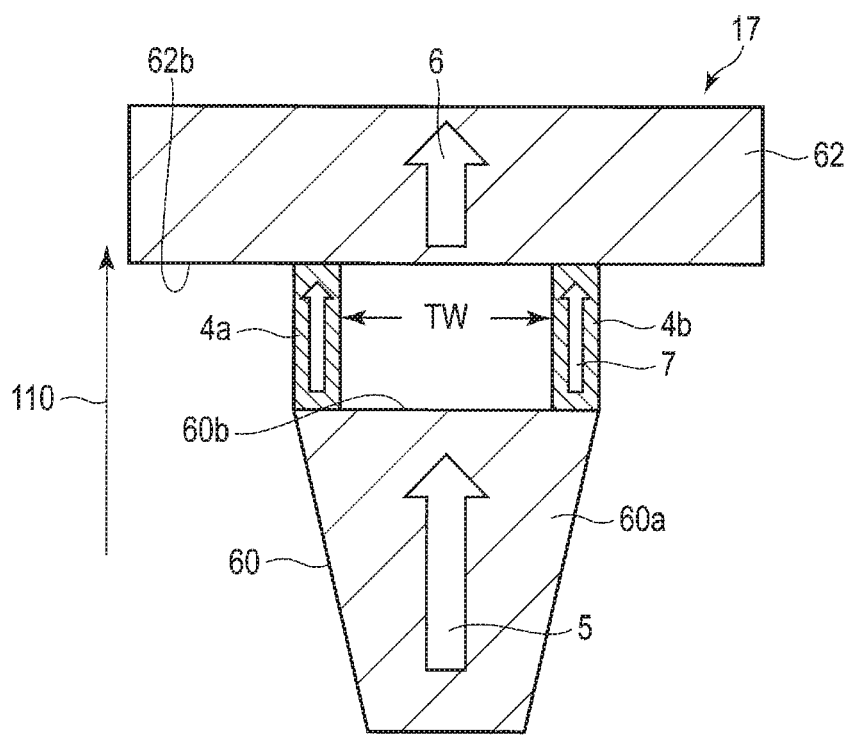
FIG. 5 is a plan view when a distal end portion of the magnetic recording head of FIG. 4 is viewed from an ABS side.

Next, the structure of the magnetic heads 17 will be described in detail. FIG. 3 is an enlarged sectional view partially showing the head portion of the magnetic head and the magnetic disk, FIG. 4 is an enlarged sectional view partially showing a distal end portion of the magnetic recording head and the magnetic disk, and FIG. 5 is a plan view when the distal end portion of the magnetic recording head is viewed from an air bearing surface (ABS) side. In the plan view of the magnetic recording head from the ABS side, hatching is used for making compositions clearly understandable.

As shown in FIGS. 2 and 3, the slider 42 of the magnetic head 17 is formed of, for example, a sintered body of alumina and titanium carbide (AlTiC), and the head portion 44 is formed by stacking thin films. The slider 42 has a disk-facing surface (air bearing surface (ABS)) 43 which is rectangular and faces the surface of the magnetic disk 16. The slider 42 is floated by an airflow C which is generated between the disk surface and the ABS 43 by rotation of the magnetic disk 16. The direction of the airflow C conforms to a rotation direction B of the magnetic disk 16. The slider 42 is arranged such that the longitudinal direction of the ABS 43 substantially conforms to the direction of the airflow C with respect to the surface of the magnetic disk 16.

The slider 42 comprises a leading end 42a located on the inflow side of the airflow C and a trailing end 42b located on the outflow side of the airflow C. A leading step, a trailing step, a side step, a negative pressure cavity and the like (not shown) are formed on the ABS 43 of the slider 42.

As shown in FIG. 3, the head portion 44 comprises a reproducing head 54 and a magnetic recording head 58 which are formed in a thin-film process at the trailing end 42b of the slider 42, and is formed as a separate type magnetic head. Further, the head portion 44 comprises a spin torque oscillator (STO) 65 as a high-frequency oscillator.

The reproducing head 54 is composed of a magnetic film 55 which produces a magnetoresistive effect, and shield films 56 and 57 which are arranged on the trailing side and leading side of the magnetic film 55 such that the magnetic film 55 is sandwiched between the shield films 56 and 57. The lower ends of the magnetic film 55 and the shield films 56 and 57 are exposed at the ABS 43 of the slider 42.

The magnetic recording head 58 is provided on the trailing end 42b side of the slider 42 with respect to the reproducing head 54. The magnetic recording head 58 comprises a main magnetic pole (recording magnetic pole) 60, an auxiliary magnetic pole (trailing shield) 62 which is arranged on the trailing side of the main magnetic pole 60 across a recording gap WG from the main magnetic pole 60, a coupling portion 67 which physically and magnetically couples the upper portion of the main magnetic pole 60 with the auxiliary magnetic pole 62, a recording coil 70, the high-frequency oscillator, for example, the spin torque oscillator 65.

The main magnetic pole 60 is formed of a soft magnetic material having high magnetic permeability and high saturation magnetic flux density, and generates a recording magnetic field in a direction perpendicular to the surface of the magnetic disk 16 (to the recording layer). The auxiliary magnetic pole 62 is formed of a soft magnetic material, and is provided to efficiently close a flux path via the soft magnetic layer 102 located directly below the main magnetic pole. An electrically-insulating layer 61 is provided in the coupling portion 67 which couples the main magnetic pole 60 and the auxiliary magnetic pole 62 together, and the main magnetic pole 60 and the auxiliary magnetic pole 62 are electrically insulated from each other.

As shown in FIG. 3, the reproducing head 54 and the magnetic recording head 58 are covered with an insulating material 76 except for portions thereof exposed at the ABS 13 of the slider 42. The insulating material 76 forms the outer shape of the magnetic head 17.

For example, the recording coil 70 is wound around the coupling portion 67 between the main magnetic pole 60 and the trailing shield 62. The recording coil 70 is connected to terminals 64 via wiring lines 77, and a second power source 80 is connected to the terminals 64. A recording current Iw supplied from the second power source 80 to the recording coil 70 is controlled by a controller of the HDD. When a signal is written to the magnetic disk 16, a predetermined recording current Iw is supplied from the second power source 80 to the recording coil 70, a magnetic flux is caused to flow into the main magnetic pole 60, and a recording magnetic field is generated.

As shown in FIGS. 3, 4 and 5, the main magnetic pole 60 extends substantially perpendicularly to the surface of the magnetic disk 16. A distal end portion 60a of the main magnetic pole 60 on the magnetic disk 16 side is tapered toward the disk surface. The distal end portion 60a of the main magnetic pole 60 is, for example, trapezoidal in section. The distal end surface of the main magnetic pole 60 is exposed at the ABS 43 of the slider 42. The width of a trailing side end surface 60b of the distal end portion 60a substantially corresponds to the width of tracks of the magnetic disk 16.

The auxiliary magnetic pole 62 substantially has the shape of letter L, and a distal end portion 62a thereof has the shape of a long and thin rectangle. The distal end surface of the auxiliary magnetic pole 62 is exposed at the ABS 43 of the slider 42. The distal end portion 62a of the auxiliary magnetic pole 62 has a leading side end surface (magnetic pole end surface) 62b which faces the distal end portion 60a of the main magnetic pole 60. The leading side end surface 62b is sufficiently longer than the width of the distal end portion 60a of the main magnetic pole 60 and the track width of the magnetic disk 16, and extends in the width direction of tracks of the magnetic disk 16. On the ABS 43, the leading side end surface 62b faces the trailing side end surface 60b of the main magnetic pole 60 in parallel across the recording gap WG.

As shown in FIG. 5, in the recording gap WG of the magnetic recording head employed in the first embodiment, a first magnetic bypass layer 4a and a second magnetic bypass layer 4b are provided in a track direction indicated by an arrow 110. The track direction corresponds to a circumference direction of the magnetic disk 16. The direction of arrow 110 is the same as the rotation direction B. The first magnetic bypass layer 4a and the second magnetic bypass layer 4b are arranged at a distance TW from each other in a track width direction. When a write current is supplied to the recording coil, the directions of magnetization of the main magnetic pole 60, the magnetic bypass layers 4a and 4b and the auxiliary magnetic pole 62 are aligned with each other in substantially the same direction in the track direction as indicated by arrows 5, 7 and 6. As a result, the effect of leading a part of the recording magnetic field applied from the main magnetic pole 60 to the magnetic disk 16 into the magnetic bypass layers 4a and 4b is produced in the vicinity of the recording gap. Therefore, it is possible to prevent a magnetic field in end portions in the track width direction of the main magnetic pole which results in a fringing field to adjacent tracks.

The distance between the first magnetic bypass layer 4a and the second magnetic bypass layer 4b may correspond to the track width, for example. The length in the track direction of the first magnetic bypass layer 4a and the second magnetic bypass layer 4b can be less than or equal to the length of the recording gap WG. Further, the length in a direction perpendicular to the ABS 43 of the first magnetic bypass layer 4a and the second magnetic bypass layer 4b can be similar to, for example, the length in the direction perpendicular to the ABS 43 of the leading side end surface 62b and the distal end portion 60a of the main magnetic pole 60. Here, the first magnetic bypass layer 4a and the second magnetic bypass layer 4b are provided in direct contact with the main magnetic pole 60 and the auxiliary magnetic pole 62 but may be separated from one or both of the main magnetic pole 60 and the auxiliary magnetic pole 62.

Alternatively, part of the auxiliary magnetic pole 62 may be formed as the first magnetic bypass layer 4a and the second magnetic bypass layer 4b.

The thickness (length in the track width direction) of the first magnetic bypass layer 4a and the second magnetic bypass layer 4b can be selected according to the width of the main magnetic pole 60.

A magnetic material such as Fe, Co or Ni or alloy thereof can be used for the first magnetic bypass layer 4a and the second magnetic bypass layer 4b. The first magnetic bypass layer 4a and the second magnetic bypass layer 4b can be formed of the same material as each other. The first magnetic bypass layer 4a and the second magnetic bypass layer 4b can be formed by performing sputtering using one or more targets for the above-described magnetic material on the main magnetic pole 60 or the auxiliary magnetic pole 62.

First Modified Example

Figure 6:
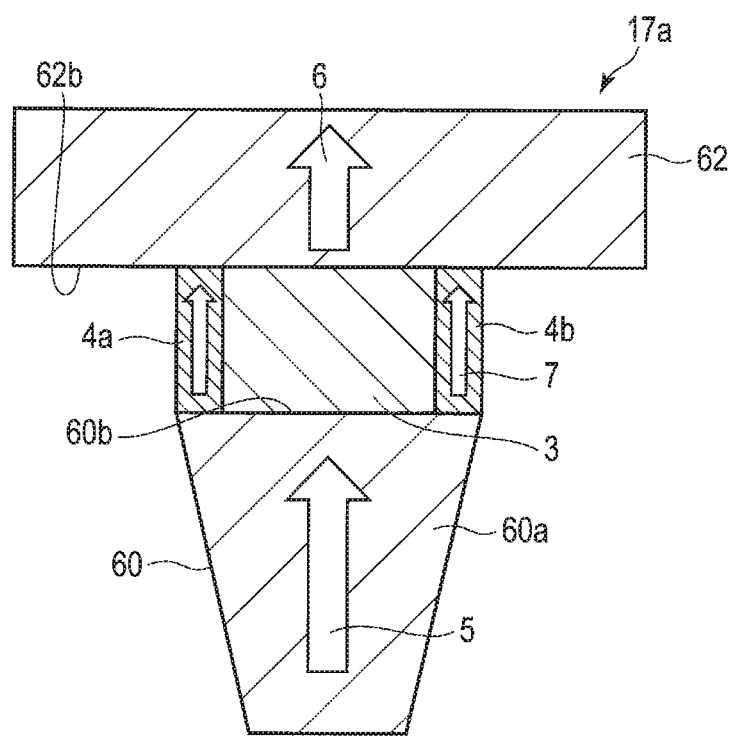
FIG. 6 is a view when a magnetic recording head of an HDD according to a first modified example is viewed from an ABS.

FIG. 6 is a view when a magnetic recording head of an HDD according to a first modified example is viewed from an ABS.

As shown in the drawing, a magnetic recording head 17a of the HDD according to the first modified example has a structure similar to that of FIG. 5 except that a nonmagnetic layer 3 is further provided between the first magnetic bypass layer 4a and the second magnetic bypass layer 4b.

For example, a nonmagnetic material such as Cu, Al Ta or Ru or oxide thereof can be used for the nonmagnetic layer 3. The nonmagnetic layer can be formed by sputtering the above-described nonmagnetic material using one or more targets for the above-described nonmagnetic material on the main magnetic pole 60 or the auxiliary magnetic pole 62.

In FIG. 6, a nonmagnetic material is arranged in a central portion in the track width direction of the main magnetic pole, and magnetic bypass layers are arranged in end portions in the track width direction of the main magnetic pole. As described above, most of a recording magnetic field is applied to the magnetic disk in a portion where the material of the auxiliary magnetic pole is a nonmagnetic material, and the recording magnetic field is reduced in the vicinities of the magnetic bypass layers.

Figure 7:
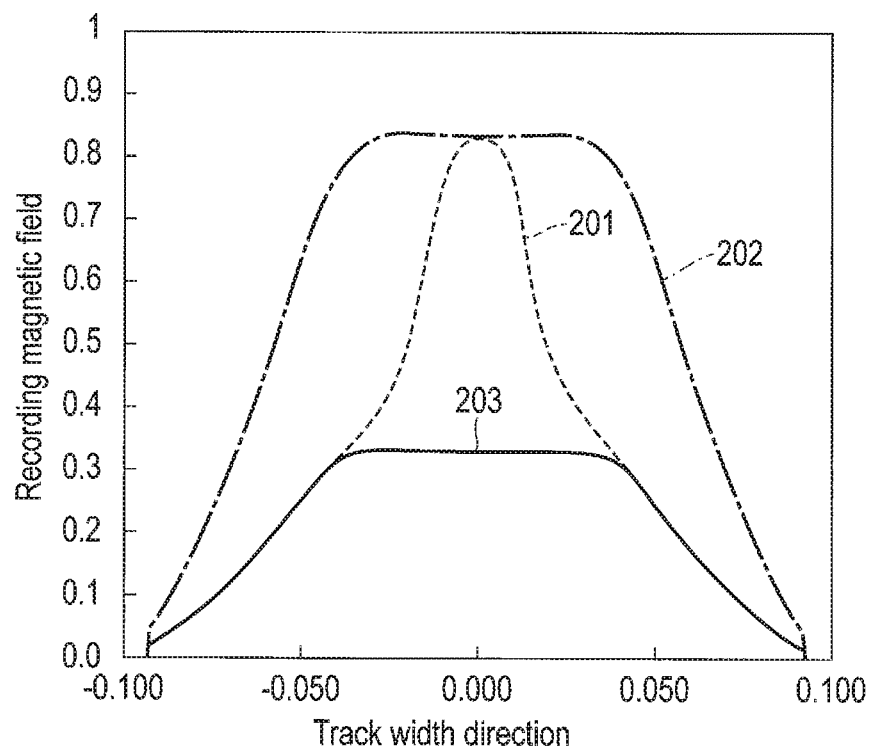
FIG. 7 is a view showing a recording magnetic field distribution with respect to a track width direction of the first modified example.

The recording magnetic field distribution with respect to the track width direction in this case is shown in FIG. 7. As shown in a graph 201, according to the first modified example, it is possible to maintain the most intense recording magnetic field, that is, the magnetic field in the central portion in the track width direction of the main magnetic pole by providing the nonmagnetic layer between the main magnetic pole and the auxiliary magnetic pole, and it is also possible to prevent the magnetic field in the end portions in the track width direction of the main magnetic pole which results in a fringing field to adjacent tracks by arranging the magnetic bypass layers on the side surfaces of the nonmagnetic layer in the track direction, respectively.

As a comparative example 1, a recording magnetic field distribution of a case where a recording gap is filled with a nonmagnetic layer is shown in a graph 202. In this case, when a write current is supplied to a recording coil, the directions of magnetization of a main magnetic pole and an auxiliary magnetic pole are aligned with each other in substantially the same direction in a track direction. In this occasion, most of a magnetic field generated from the main magnetic pole is emitted to a magnetic disk and recording is performed, but part of the magnetic field is led directly into the auxiliary magnetic pole via the recording gap. As shown in the drawing, the intensity of the magnetic field in a central portion in a track width direction of the main magnetic pole is similar to that of the first modified example, the magnetic field is also intense in end portions in the track width direction of the main magnetic pole as compared to that of the graph 201, and a fringing field is generated in adjacent tracks.

Further, as a comparative example 2, a recording magnetic field distribution of a case where a recording gap is filled with a magnetic bypass layer in place of a nonmagnetic layer is shown in a graph 203. In this case, the magnetic bypass layer produces the effect of leading a part of a recording magnetic field applied from a main magnetic pole to a magnetic disk when recording into a recording gap, and as shown in the drawing, a magnetic field in a central portion in a track width direction of the main magnetic pole is reduced as compared to that of the graph 201 of the first modified example and that of the graph 202 of the first comparative example 1. Further, the magnetic field in end portions in the track width direction of the main magnetic pole is similar to that of the graph 201 of the first modified example in which the magnetic bypass layers are arranged in the end portions in the track width direction of the main magnetic pole.

Accordingly, when the magnetic recording head according to the first modified example is employed, a magnetic field similar to that of the comparative example 1 in which the recording gap is filled with the nonmagnetic material is generated in a portion corresponding to the central portion in the track width direction of the main magnetic pole in which the track width direction is 0, and the magnetic field is led into the magnetic bypass layers and is gradually reduced to an extent similar to that of the comparative example 2 in the end portions in the track width direction of the main magnetic pole. As a result, it is possible to realize a magnetic recording head which can prevent a fringing field while maintaining a recording magnetic field in the central portion of a main magnetic pole. Further, it is possible to realize a magnetic field distribution which further prevents the fringing field while maximizing the intensity of the magnetic field in the central portion in the track width direction of the main magnetic pole by optimizing the material and dimensions of magnetic bypass layers.

Second Modified Example

Figure 8A:
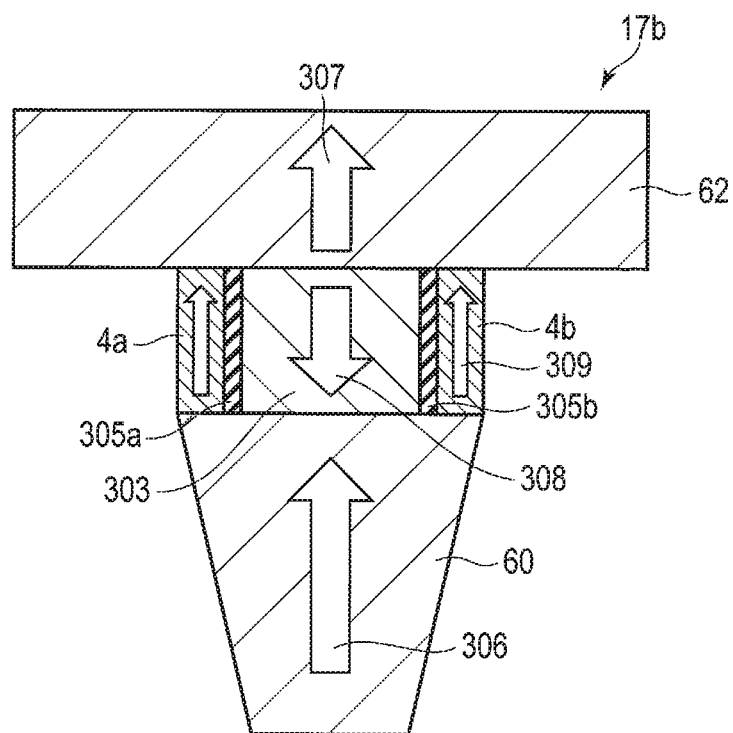
FIG. 8A is a view when a magnetic recording head of an HDD according to a second modified example is viewed from an ABS.

FIG. 8A is a view when a magnetic recording head of an HDD according to a second modified example is viewed from an ABS.

As shown in the drawing, a magnetic recording head 17b of the HDD according to the second modified example is similar to that of FIG. 5 except that a magnetic flux control layer (MFCL) 303 is further provided between the first magnetic bypass layer 4a and the second magnetic bypass layer 4b via a first insulating layer 305a and a second insulating layer 305b.

Figure 8B:
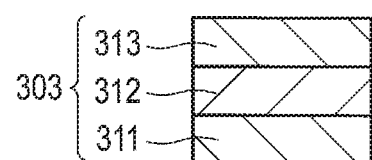
FIG. 8B is a view showing a structure of a magnetic flux control layer used in FIG. BA.

FIG. 8B is a view showing the structure of the magnetic flux control layer of the magnetic head shown in FIG. 8A.

As shown in the drawing, the magnetic flux control layer 303 comprises a first conductive layer 311 which is provided on the main magnetic pole 60, an adjustment layer 312 which is stacked on the first conductive layer 311 and is formed of a magnetic material containing at least one of iron, cobalt and nickel, and a second conductive layer 313 which electrically connects the adjustment layer 312 and the auxiliary magnetic pole 62. The magnetic flux control layer 303 generates a spin torque when current is supplied to the adjustment layer 312 when recording, and produces the effect of inverting the direction of magnetization in the adjustment layer 312. Here, this effect is referred to as an assist effect. Therefore, the magnetic recording head of the HDD according to the second modified example is configured to supply current to the adjustment layer 312 when recording.

Figure 9:
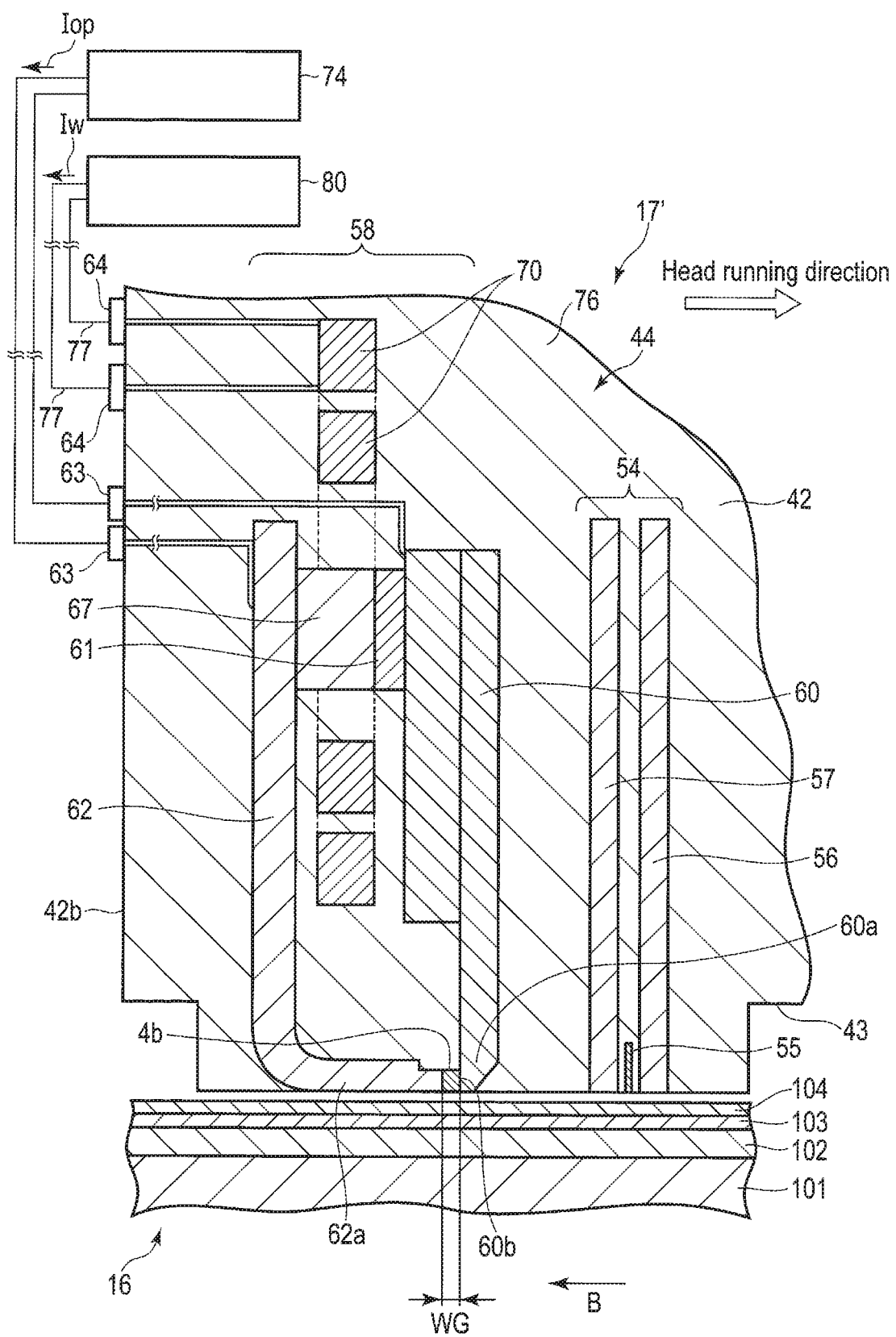
FIG. 9 is an enlarged sectional view showing a head portion of the magnetic recording head of the HDD according to the second modified example.

FIG. 9 is an enlarged sectional view showing a head portion of the magnetic recording head of the HDD according to the second modified example.

A magnetic head 17' of the HDD according to the second modified example can be employed in place of the magnetic head 17 of the HDD of FIG. 1, and has a structure similar to that of FIG. 3 except that the main magnetic pole 60 and the auxiliary magnetic pole 62 are electrically connected to electrode terminals 63 provided at the trailing end 42b of the slider 42 and these electrode terminals 63 are connected to a power source 74 via wiring lines. Accordingly, a current circuit which supplies a current Iop from the power source 74 to the wiring lines, the main magnetic pole 60, the magnetic flux control layer 303 and the trailing shield 62 in series is constituted.

In the magnetic recording head of the HDD according to the second modified example, a fringing field when assisted is prevented by providing the magnetic bypass layers 4a and 4b in the magnetic recording head comprising the magnetic flux control layer 303. When current is supplied to the magnetic flux control layer 303 and the magnetic flux control layer 303 is thereby driven, the direction of magnetization of the magnetic flux control layer 303 is, as indicated by an arrow 308, inverted to the direction opposite to that of the recording gap magnetic field indicated by arrows 306 and 307, but the direction of magnetization of the magnetic bypass layers 4a and 4b is, as indicated by an arrow 309, opposite to that of the magnetic flux control layer 303, that is, the same as that of the recording gap magnetic field. As a result, the intensity of the magnetic field required for recording in the central portion of the main magnetic pole is increased by the driving of the magnetic flux control layer 303, and in the meantime, the magnetic field in the end portions in the track width direction of the main magnetic pole 60 is led into the magnetic bypass layers 4a and 4b and a fringing field in the track width direction resulting therefrom can be prevented. Further, the magnetic recording head of the HDD according to the second modified example can be applied to the main magnetic pole 60 which is wide to some extent and can perform write to narrow tracks without causing reduction in manufacturing yield. Accordingly, recording can be performed in regions narrower than before, and recording density can be improved.

At least one of Cu, Au, Ag, Al, Ir and NiAl alloy can be used for the first conductive layer 311 used in the magnetic flux control layer. At least one of Ta, Ru, Pt, W and Mo can be used for the second conductive layer 313.

The adjustment layer 312 includes a magnetic material containing at least one of iron, cobalt and nickel. For example, an alloy material in which at least one of Al, Ge, Si, Ga, B, C, Se, Sn and Ni is added to FeCo, and at least one material selected from an artificial lattice group consisting of Fe/Co, Fe/Ni and Co/Ni can be used for the adjustment layer. The thickness of the adjustment layer can be, for example, 2 to 20 nm.

Further, an underlayer can be provided between the main magnetic pole 60 and the first conductive layer 311.

For example, metal such as Ta or Ru can be used for the underlayer. The thickness of the underlayer can be, for example, 0.5 to 10 nm. Further, the thickness of the underlayer can be about 2 nm.

Still further, a cap layer can be provided between the auxiliary magnetic pole 62 and the second conductive layer 313.

At least one nonmagnetic element selected from a group consisting of Cu, Ru, W and Ta can be used for the cap layer. The thickness of the cap layer can be, for example, 0.5 to 10 nm. Further, the thickness of the cap layer can be about 2 nm.

All the layers can be formed by sputtering. One target or two or more targets may be used for sputtering.

Third Modified Example

FIG. 10 is a view when a magnetic recording head of an HDD according to a third modified example is viewed from an ABS.

As shown in the drawing, a magnetic recording head 17c of the HDD according to the third modified example is similar to that of FIG. 8A except that a first insulating layer 305a' is further provided between the first magnetic bypass layer 4a and the main magnetic pole 60 and a second insulating layer 305b' is further provided between the second magnetic bypass layer 4b and the main magnetic pole 60. When the first insulating layer 305a' and the second insulating layer 305' are provided, a flowing current which excites a spin torque will flow only to the magnetic flux control layer 303, and the direction of magnetization can be efficiently inverted.

Figure 11:
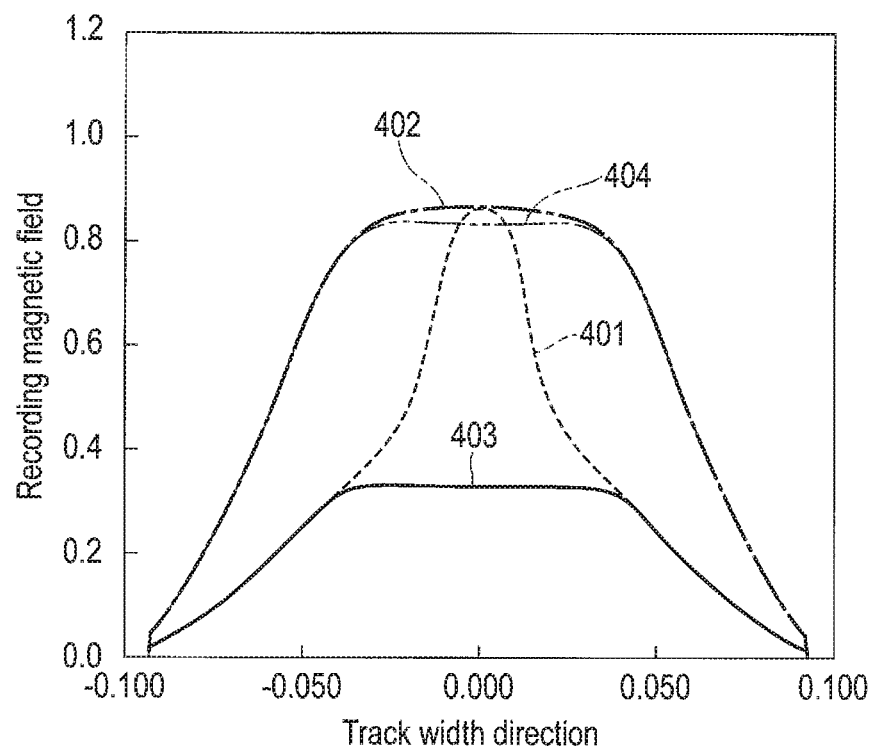
FIG. 11 is a view showing a recording magnetic field distribution with respect to a track width direction of the third modified example.

The regarding magnetic field distribution of the magnetic recording head of the HDD according to the third modified example is shown in FIG. 11.

As shown in the drawing, when the magnetic recording head of the HDD according to the third modified example is employed, as shown in a graph 401, the intensity of the magnetic field in the central portion in the track width direction of the main magnetic pole 60 is increased by the assist effect and is higher than that of the graph 201 of FIG. 7, and in the meantime, the magnetic field in the end portions in the track width direction of the main magnetic pole 60 flows in a recording gap direction and the magnetic field toward the recording medium is more controlled than that of the graph 201 of FIG. 7. According to the third modified example, if the material selection and the dimensions of the magnetic flux control layer and the magnetic bypass layers are optimized, recording can be performed on narrower tracks, and high recording density can be achieved.

As a comparative example 3, the recording magnetic field distributions of a magnetic recording head in which only a magnetic flux control layer is provided but magnetic bypass layers are not provided between a main magnetic pole and an auxiliary magnetic pole are shown in graphs 402 and 403.

The graph 402 is of a case where current is supplied, and as shown in the drawing, when current is supplied to the magnetic recording head in which only the magnetic flux control layer is provided, the intensity of a magnetic field is uniformly increased. In this occasion, due to a spin transfer torque (STT) generated by a minority spin between the main magnetic pole or the magnetic flux control layer and the auxiliary magnetic pole, the direction of magnetization of the magnetic flux control layer is inverted. As a result, part of the magnetic field applied from the main magnetic pole to a recording gap is applied in a recording medium direction, and the total magnetic field applied from the main magnetic field to a recording medium increases and recording performance improves. However, as the intensity of the recording magnetic field increases by the assist effect, a fringing field to adjacent tracks increases and fringing worsens. To prevent the fringing field, the main magnetic pole can be thinly manufactured. In this case, however, the level of difficulty of aligning the main magnetic pole 60 with the magnetic flux control layer in the manufacturing process of the magnetic flux control layer 303 increases, and this may cause reduction in manufacturing yield.

Further, the graph 403 is of a case where current is not supplied, and when current is not supplied to the magnetic recording head in which only the magnetic flux control layer is provided, the direction of magnetization of the magnetic flux control layer is also aligned in substantially the same direction by a magnetic field generated in a recording gap. In this case, since the magnetic flux control layer is provided, the effect of leading the magnetic field into the recording gap is increased, and write performance is degraded.

A graph 404 shows the recording magnetic field distribution of a magnetic recording head in which only a nonmagnetic layer is provided between a main magnetic pole and an auxiliary magnetic pole in place of a magnetic flux control layer and magnetic bypass layers are not provided similarly to the comparative example 1, and the intensity of a magnetic field in the central portion in the track width direction of the main magnetic pole is substantially the same as that of the third modified example, but the magnetic field is also intense in the end portions in the track width direction of the main magnetic pole, and a fringing field is generated in adjacent tracks.

Fourth Modified Example

Figure 12:
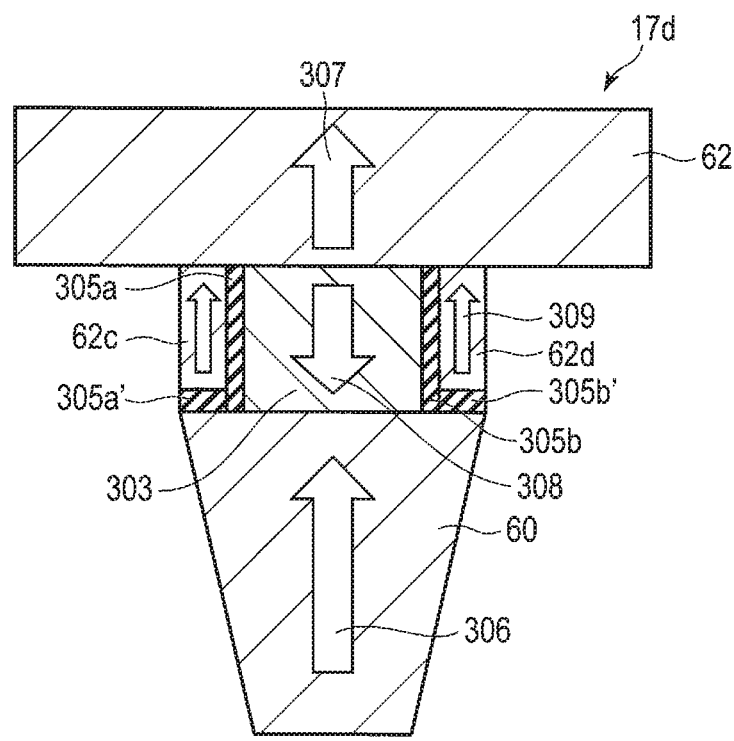
FIG. 12 is a view when a magnetic recording head of an HDD according to a fourth modified example is viewed from an ABS.

FIG. 12 is a view when a magnetic recording head of an HDD according to a fourth modified example is viewed from an ABS.

As shown in the drawing, a magnetic recording head 17d of the HDD according to the fourth modified example has a structure similar to that of FIG. 10 except that a first magnetic bypass portion 62c and a second magnetic bypass portion 62d which are part of the auxiliary magnetic pole 62 extending on both side surfaces of the magnetic flux control layer 303, respectively, via the insulating layers 305a and 305b and are spaced apart from each other in the track width direction are applied in place of the first magnetic bypass layer 4a and the second magnetic bypass layer 4b which are spaced apart from each other in the track width direction. In the magnetic recording head 17d, the magnetic bypass portions 62c and 62d function as the magnetic bypass layers.

In the fourth modified example, a nonmagnetic layer can be used in place of the magnetic flux control layer 303 similarly to the first modified example. In this case, advantages similar to those of the first modified example can be achieved. Alternatively, as is the case with the magnetic recording head employed in the first embodiment, it is possible to leave a space between the first magnetic bypass portion 62c and the second magnetic bypass portion 62d without providing anything in the portion of the magnetic flux control layer 303. In that case, advantages similar to those of the first embodiment can be achieved.

In the embodiment, the magnetic flux control layer 303 is formed by stacking the first conductive layer 311, the adjustment layer 312 and the second conductive layer 313 in order on the main magnetic pole 60, but these layers may be stacked in reverse order, that is, the magnetic flux control layer may be formed by stacking the first conductive layer 311, the adjustment layer 312 and the second conductive layer 313 in order on the auxiliary magnetic pole 62.

Further, in the second modified example, the third modified example and the fourth modified example, an insulating material is inserted at the interface of the magnetic bypass layer and the magnetic flux control layer, but the insulating layer at the interface can be omitted if a current density sufficient for producing an assist effect can be obtained with respect to the magnetic flux control layer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording head comprising:
   a main magnetic pole which applies a recording magnetic field to a magnetic recording medium;
   an auxiliary magnetic pole which faces the main magnetic pole across a recording gap;
   a first magnetic bypass layer provided in the recording gap along a track direction; and
   a second magnetic bypass layer provided in the recording gap along the track direction and arranged at a distance from the first magnetic bypass layer in a track width direction.

2. The magnetic recording head of claim 1, further comprising a nonmagnetic layer between the first magnetic bypass layer and the second magnetic bypass layer.

3. The magnetic recording head of claim 1, further comprising a magnetic flux control layer between the first magnetic bypass layer and the second magnetic bypass layer, which includes a first conductive layer provided on the main magnetic pole, an adjustment layer provided on the first conductive layer and comprising one magnetic material of iron, cobalt or nickel, and a second conductive layer electrically connecting the adjustment layer and the auxiliary magnetic pole, and inverts a direction of magnetization in the adjustment layer by a spin torque.

4. The magnetic recording head of claim 3, wherein
   the first conductive layer comprises one of copper, gold, silver, aluminum, iridium or nickel-aluminum alloy, and
   the second conductive layer comprises one of tantalum, ruthenium, platinum, tungsten or molybdenum.

5. The magnetic recording head of claim 3, wherein
   the first conductive layer comprises one of tantalum, ruthenium, platinum, tungsten or molybdenum, and
   the second conductive layer comprises one of copper, gold, silver, aluminum, iridium or nickel-aluminum alloy.

6. The magnetic recording head of claim 3, wherein the adjustment layer comprises an alloy material and a multilayer,
   wherein the alloy material comprises iron-cobalt alloy and one additive of aluminum, germanium, silicon, gallium, boron, carbon, selenium, tin or nickel,
   wherein the multilayer is one of iron/cobalt, iron/nickel or cobalt/nickel.

7. The magnetic recording head of claim 1, wherein the distance corresponds to a track width.

8. A magnetic recording head, comprising:
   a main magnetic pole which applies a recording magnetic field to a magnetic recording medium;
   an auxiliary magnetic pole which faces the main magnetic pole across a recording gap;
   a first magnetic bypass portion provided in the recording gap and extending from the auxiliary magnetic pole along a track direction; and
   a second magnetic bypass portion provided in the recording gap, extending from the auxiliary magnetic pole along the track direction and arranged at a distance from the first magnetic bypass portion in a track width direction.

9. The magnetic recording head of claim 8, further comprising a nonmagnetic layer between the first magnetic bypass portion and the second magnetic bypass portion.

10. The magnetic recording head of claim 8, further comprising a magnetic flux control layer between the first magnetic bypass layer and the second magnetic bypass layer, which includes a first conductive layer provided on the main magnetic pole, an adjustment layer provided on the first conductive layer and comprising one magnetic material of iron, cobalt or nickel, and a second conductive layer electrically connecting the adjustment layer and the auxiliary magnetic pole, and inverts a direction of magnetization in the adjustment layer by a spin torque.

11. The magnetic recording head of claim 10, wherein
    the first conductive layer comprises one of copper, gold, silver, aluminum, iridium or nickel-aluminum alloy, and
    the second conductive layer comprises one of tantalum, ruthenium, platinum, tungsten or molybdenum.

12. The magnetic recording head of claim 10, wherein
    the first conductive layer comprises one of tantalum, ruthenium, platinum, tungsten or molybdenum, and
    the second conductive layer comprises one of copper, gold, silver, aluminum, iridium or nickel-aluminum alloy.

13. The magnetic recording head of claim 10, wherein the adjustment layer comprises an alloy material and a multilayer,
    wherein the alloy material comprises iron-cobalt alloy and one additive of aluminum, germanium, silicon, gallium, boron, carbon, selenium, tin or nickel,
    wherein the multilayer is one of iron/cobalt, iron/nickel, or cobalt/nickel.

14. The magnetic recording head of claim 8, wherein the distance corresponds to a track width.

15. A magnetic recording and reproducing device comprising:
    a rotatable disk-shaped magnetic recording medium including a magnetic recording layer; and
    a magnetic recording head which records information on the magnetic recording medium and comprises
    a main magnetic pole which applies a recording magnetic field to the magnetic recording medium,
    an auxiliary magnetic pole which faces the main magnetic pole across a recording gap,
    a first magnetic bypass layer provided in the recording gap along a track direction, and
    a second magnetic bypass layer provided in the recording gap along the track direction and is arranged at a distance from the first magnetic bypass layer in a track width direction.

16. The magnetic recording and reproducing device of claim 15, further comprising a nonmagnetic layer between the first magnetic bypass layer and the second magnetic bypass layer.

17. The magnetic recording and reproducing device of claim 15, further comprising a magnetic flux control layer between the first magnetic bypass layer and the second magnetic bypass layer, which includes a first conductive layer provided on the main magnetic pole, an adjustment layer provided on the first conductive layer and comprising one magnetic material of iron, cobalt or nickel, and a second conductive layer electrically connecting the adjustment layer and the auxiliary magnetic pole, and inverts a direction of magnetization in the adjustment layer by a spin torque.

18. The magnetic recording and reproducing device of claim 17, wherein
the first conductive layer comprises one of copper, gold, silver, aluminum, iridium or nickel-aluminum alloy, and
the second conductive layer comprises one of tantalum, ruthenium, platinum, tungsten or molybdenum.

19. The magnetic recording and reproducing device of claim 17, wherein
the first conductive layer comprises one of tantalum, ruthenium, platinum, tungsten or molybdenum, and
the second conductive layer comprises one of copper, gold, silver, aluminum, iridium or nickel-aluminum alloy.

20. The magnetic recording and reproducing device of claim 17, wherein the adjustment layer comprises an alloy material and a multilayer,
wherein the alloy material comprises iron-cobalt alloy and one additive of aluminum, germanium, silicon, gallium, boron, carbon, selenium, tin or nickel,
wherein the multilayer is one of iron/cobalt, iron/nickel or cobalt/nickel.

21. The magnetic recording and reproducing device of claim 15, wherein the distance corresponds to a track width.

* * * * *